(12) United States Patent
Fitzgerald

(10) Patent No.: US 8,018,749 B2
(45) Date of Patent: Sep. 13, 2011

(54) SYNCHRONOUS RECTIFIER

(75) Inventor: William Vincent Fitzgerald, Zionsville, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 784 days.

(21) Appl. No.: 11/992,576

(22) PCT Filed: Sep. 28, 2005

(86) PCT No.: PCT/US2005/034990
§ 371 (c)(1), (2), (4) Date: Mar. 25, 2008

(87) PCT Pub. No.: WO2007/040513
PCT Pub. Date: Apr. 12, 2007

(65) Prior Publication Data
US 2010/0149839 A1 Jun. 17, 2010

(51) Int. Cl.
*H02M 7/217* (2006.01)
(52) U.S. Cl. ......... 363/127; 363/21.14; 323/301
(58) Field of Classification Search ......... 323/286, 323/287, 301; 363/127, 21.14, 21.06
See application file for complete search history.

(56) References Cited

U.S. PATENT DOCUMENTS

| 3,334,619 | A | 8/1967 | Penn |
| 6,490,176 | B2 * | 12/2002 | Holzer et al. ............ 363/20 |
| 2003/0235059 | A1 | 12/2003 | Perry |
| 2005/0041441 | A1 | 2/2005 | Nagai et al. |

FOREIGN PATENT DOCUMENTS
JP    2002095248    3/2002

OTHER PUBLICATIONS
Search Report Dated June 2, 2006.

* cited by examiner

*Primary Examiner* — Harry Behm
*Assistant Examiner* — Matthew Grubb
(74) *Attorney, Agent, or Firm* — Robert D. Shedd; Harvey D. Fried; Sammy S. Henig

(57) ABSTRACT

The disclosed embodiments relate to apparatus and method for reducing power losses in a power supply. There is provided an apparatus comprising means for coupling a first signal ($S_2$) to a reference level (ground) when the coupling means is conductive, means for placing the coupling means in a conductive state during a duration of a portion of a period of a second signal ($S_3$), and means for altering the duration of conduction of the coupling means in response to an amplitude of the second signal.

17 Claims, 3 Drawing Sheets

FIG. 1         PRIOR ART

SYNCHRONOUS RECTIFIER

FIELD OF THE INVENTION

This application claims the benefit under 35 U.S.C. §365 of International Application PCT/US2005/034990, filed Sep. 28, 2005, which was published in accordance with PCT article 21(2) on Apr. 12, 2007 in English.

BACKGROUND OF THE INVENTION

As shown in FIG. 1, a typical switch-mode power supply (SMPS) includes primary side components 150 and secondary side components. Primary side, also referred to as "hot side" components comprise switch-mode controller 106, a switch-mode metal-oxide-semiconductor (MOSFET) 108, MOSFET heatsink 110, current sensing resistor 112, surge suppression capacitor 114, a transformer 116 having primary winding 120, secondary winding 118, rectifier diode 102, filter capacitor 104 and an opto-isolator 126. Secondary or "cold-side" components comprise secondary transformer windings 122 and 124, rectifier diodes 128 and 136 with their respective heatsinks 130 and 138 and filter capacitors 132 and 134. The entire switch-mode supply is powered from an unregulated voltage source 100. The controller 106 provides a drive signal $V_D$ to MOSFET 108 to produce current flow in primary winding 120 of transformer 116. Secondary winding 118 of transformer 116 provides a source of voltage, which when rectified and filtered by diode 102 and capacitor 104 respectively, provide supply voltage $V_{DD}$ to controller 106. Feedback signal $V_{FB}$ is developed from a rectified and filtered secondary supply +12V and fed back to controller 106 through opto-isolator 126, thus establishing a feedback loop to control the switching on and off of MOSFET 108. By comparison of feedback signal $V_{FB}$ to a reference value in controller 106 and variation of the conduction cycle of MOSFET 108 in response to differences between the feedback signal and the reference level, regulation of operating levels in the SMPS can be realized. Resistor 112 senses the primary current flowing in MOSFET 108 which serves as the current feedback signal to current-mode controller 106. Using current-mode control prevents excessive current to be drawn from the switch-mode supply under overload conditions. By rectifying a signal from transformer 116 secondary windings 122 and 124 by diodes 128 and 136 respectively, regulated output voltages +6.5V and +12V are developed and filtered by capacitors 132 and 134 respectively. Rectification of the signals developed across windings 122 and 124 may be accomplished by diodes in series with their respective windings between ground and the supply outputs. In this described typical SMPS, one of the diodes, 128, is placed with its cathode connected to the positive output of its particular supply, thus causing both anode and cathode of diode 128 to be remote from ground. In the exemplary +12V supply, diode 136 is placed such that its anode is connected to ground. In the type rectifiers described in this exemplary switch-mode supply, an often large source of inefficiency is the voltage drop across the rectifier diodes. In higher power supplies the inefficiency introduced by the voltage drop across the diodes can be significant, thus requiring heat sinking and possibly active measures such as forced air cooling.

In order to improve the rectifier efficiency, a transistor, usually a MOSFET may be used as a low voltage-drop switch to replace a diode. This technique is referred to as synchronous rectification. Synchronous rectification requires control of the drive to the synchronous rectifier to turn the MOSFET on or off during the appropriate portions of the signal being rectified. Integrated circuit controllers are often used to control conduction of the MOSFET. These integrated circuits, such as the ST Microelectronics STS-R3, or Anachip AP436 are moderately expensive and require an additional 4 to 8 external components. These ICs often include clock generation circuits and other sophisticated methods to determine on/off control of synchronous rectifier MOSFETS. The present invention involves a less complex control circuit that may use discrete components to provide a low-cost implementation of synchronous rectification in a switch-mode power supply.

SUMMARY OF THE INVENTION

Certain aspects commensurate in scope with the originally claimed invention are set forth below; however the invention may encompass a variety of aspects that may not be set forth below.

The disclosed embodiments relate to an apparatus comprising a first device, possibly a transistor, configured to couple a first signal to a reference level when the first device is made conductive, a second device, possibly a differentiator or a high-pass filter, responsive to a second signal which may be out of phase with the first signal, the second device configured to control conduction of the first device during a portion of a period of the second signal, and a detector, possibly a diode peak detector, responsive to an amplitude of the second signal, the detector configured to alter a duration of conduction of the first device. In this apparatus the detector may reduce the duration of conduction of the first device in response to an increase in the amplitude of the second signal.

A further embodiment includes means for coupling a first signal to a reference level when said coupling means is conductive, means for placing said coupling means in a conductive state during a duration of a portion of a period of a second signal, and means for altering said duration of conduction of said coupling means in response to an amplitude of said second signal.

A yet further embodiment is a method comprising the steps of coupling a first signal to a reference level by conduction of a device, differentiating a second signal, controlling conduction of the device in response to the differentiated second signal, and altering conduction of the device in response to an amplitude of the second signal. Variations of this method may include reducing the duration of conduction of the device in response to an increase in the amplitude of the second signal.

BRIEF DESCRIPTION OF THE DRAWINGS

Embodiments of the present invention will be described below in more detail, with reference to the accompanying drawings in which similar elements in each figure have the same reference designator.

DETAILED DESCRIPTION

Figure 1:
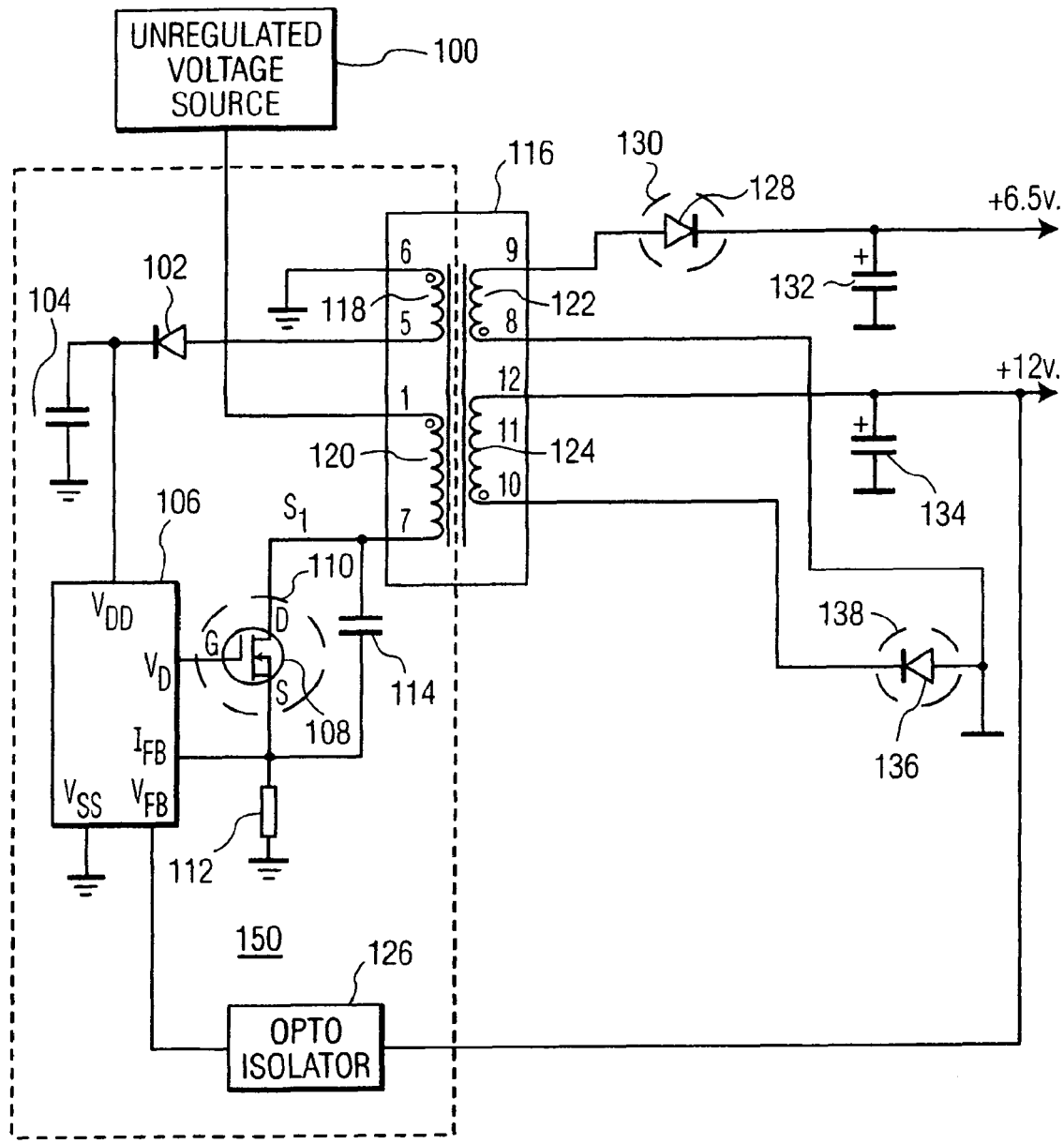
FIG. 1 is a block diagram of a typical switch-mode power supply.
Figure 2:
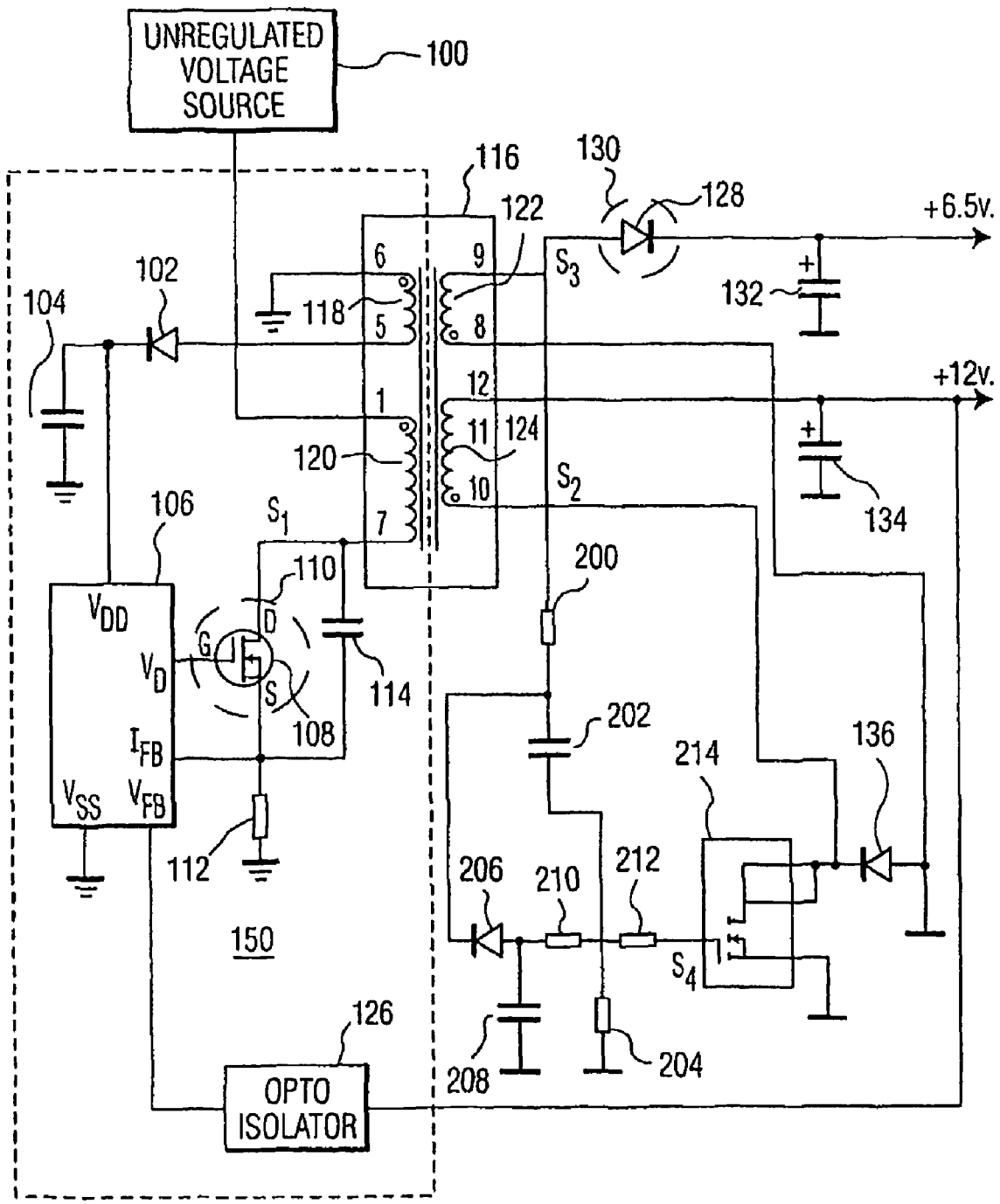
FIG. 2 is a schematic diagram of an embodiment of the present invention.

An embodiment of the discrete control circuit shown in FIG. 2 satisfies the need for a low-cost, synchronous rectifier controller. FIG. 2 shows a representative switch-mode power supply used in electronic equipment applications. The primary side circuit 150 is typical of switch-mode power supplies, is well known to those skilled in the art and is similar to that described previously. Switch-mode transformer 116 has multiple secondary windings, 122 and 124, to develop different supply voltages. Diode 128 is used in this system as a conventional rectifier. Use of this high-side rectifier for the +6.5V supply serves the dual purposes of rectifying the signal $S_3$, from winding 122 to generate the +6.5V supply and so that the AC signal, $S_3$, at the anode of diode 128 will be available to develop a switching control signal to drive synchronous rectifier MOSFET 214. MOSFET transistors can be used as rectifiers (synchronous rectification) by controlling the conduction time of the MOSFET, making the conduction coincide with the desired portion of the pulse waveform. Since the MOSFET can have much lower voltage drop than even a Schottky diode, the efficiency of the power supply can be improved. In most cases, when synchronous rectification is used, it is possible to eliminate the large heatsink normally used to cool the diodes. In the exemplary embodiment shown in FIG. 2, MOSFET 214 is arranged with its source connected to the secondary side ground. This configuration simplifies generating the drive signal to MOSFET 214. The control voltage for the gate drive of synchronous rectifier 214 is developed from the signal $S_3$. The pulse signal $S_3$ is of the opposite polarity to signal $S_2$ that appears at the drain of MOSFET 214. This phase reversal is determined by the phasing of windings 122 and 124 and is done so that the polarity of signal $S_3$ is of the phase needed to turn on the MOSFET gate when signal $S_2$ is at its most negative level. Conduction from the drain to source of MOSFET 214 when signal $S_2$ is at its most negative level clamps signal $S_2$ to ground, thus rectifying signal $S_2$ to produce the +12V output. Controller 106 is designed such that signals $S_2$ and $S_3$ can have variable duty cycles; with the positive portion of signal $S_3$ increasing in duration at higher line voltage. As a result, means are necessary for shortening the duration of the pulse at MOSFET 214 gate so as to provide the proper conduction time for the MOSFET to assure that MOSFET 214 conducts only when signal $S_2$ is at its negative level. Capacitor 202 and resistor 204 form a high-pass filter that differentiates the waveform on signal $S_3$ to produce the drive waveform for the MOSFET 214 gate. Differentiation of the waveform aids to reduce the conduction time of MOSFET 214 so that MOSFET 214 turns on at or after the voltage at its drain is negative and turns off at or before its drain voltage goes high. A low power (by comparison to a conventional rectifier diode such as diode 128) diode 136 conducts during the negative excursion of signal $S_2$ during which time the MOSFET may not be turned on due to the gate drive interval to MOSFET 214 possibly being of lesser duration than the negative excursion of signal $S_2$. The function just described for diode 136 could also be performed by an internal parasitic diode in MOSFET 214. Diode 206 and capacitor 208 rectify signal $S_3$ to develop a negative bias voltage that is proportional to the value of unregulated voltage source 100 (and to the AC line input voltage). As the negative bias increases it reduces the average voltage at the gate of MOSFET 214 and thus reduces the conduction time of the MOSFET. The voltage divider formed by resistors 210 and 204 scale the negative bias developed by diode 206 and capacitor 208 to establish the desired range of negative bias added to the gate drive. This negative bias on the gate of MOSFET 214 prevents excess conduction (and increased losses) at high line voltages. Resistor 200 provides current limiting for the negative supply formed by diode 206. Resistor 212 reduces the rise time of the drive voltage to MOSFET 214 gate to minimize radiated noise due to fast switching transients.

Figure 3:
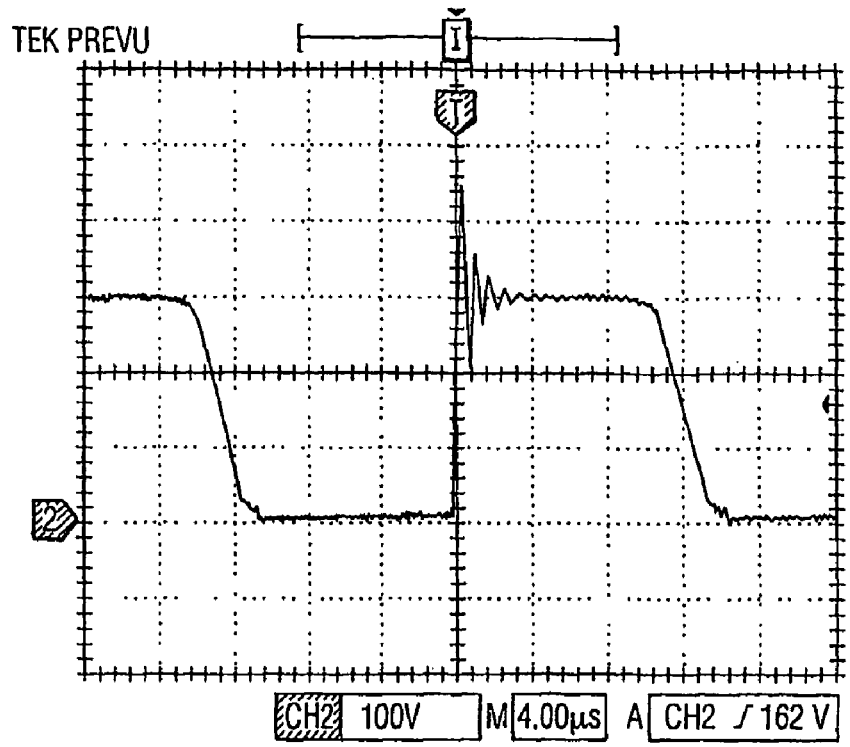
FIG. 3 is a representative waveform of the drain voltage of the main switching MOSFET (108)
Figure 4:
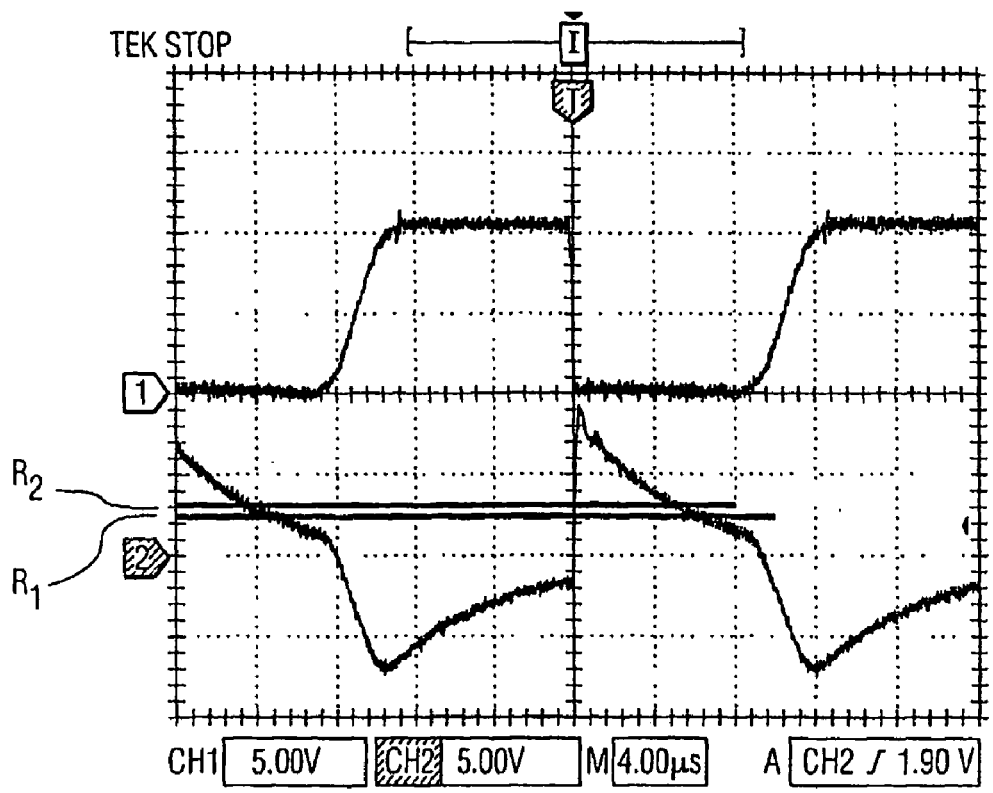
FIG. 4 shows representative waveforms of the drain voltage and gate voltage of a synchronous rectifier MOSFET in an embodiment of the invention.

The waveform depicted in FIG. 3 shows the signal $S_1$ at the drain of switch-mode MOSFET 110, this voltage being the primary voltage on winding 120 of transformer 116. The upper trace of FIG. 4 depicts the signal voltage $S_2$ which is induced in secondary winding 124, this being also the voltage on the drain of synchronous rectifier MOSFET 214. The lower trace of FIG. 4 depicts the gate drive to MOSFET 214. The conduction threshold of MOSFET 214 is approximately 2.5 volts to 3.0 volts, as shown by $R_1$ and $R_2$ in FIG. 4. Projecting the point in time of the gate drive signal passing the conduction threshold onto the drain voltage waveform in the upper plot of FIG. 4 indicates that the MOSFET 214 conduction is well within the interval of the negative excursion of signal $S_2$. It can also be seen from the gate drive waveform in FIG. 4 that increasing the negative bias applied to the gate of MOSFET 214 through detector 206, as occurs at higher line voltage, will reduce the period of time that the gate drive voltage is above the conduction threshold $R_1$ or $R_2$.

While the present invention has been described with reference to the preferred embodiments, it is apparent that various changes may be made in the embodiments without departing from the spirit and the scope of the invention.

The invention claimed is:

1. A switch mode power supply apparatus, comprising:
   a transformer;
   a source of an input supply voltage;
   a first switching transistor for periodically coupling said input supply voltage to said transformer to produce an alternating current supply voltage in a first winding of said transformer;
   a second switching transistor forming a synchronous rectifier coupled to said first winding for rectifying said alternating current supply voltage to produce a rectified output that is coupled to a load, said second switching transistor being conductive, during a portion of a period of said alternating current supply voltage; and
   a detector responsive to said input supply voltage, during a portion of said period, when said first switching transistor couples said input supply voltage to said transformer, for developing a first control signal coupled to said second switching transistor, said detector being configured to detect a magnitude of said input supply voltage and to alter, in accordance with said magnitude, when, during said period, conduction of said second switching transistor will end in a manner to alter a duration of the conduction of said second switching transistor.

2. The apparatus of claim 1 wherein said detector reduces said duration of conduction of said second switching transistor in response to an increase in said input supply voltage magnitude.

3. The apparatus of claim 1 wherein said second switching transistor is coupled between said first winding and a reference level.

4. The apparatus of claim 1 wherein said second switching transistor comprises a metal-oxide-semiconductor.

5. The apparatus of claim 1 wherein said transformer produces a second control signal containing timing information that is coupled from said transformer to said second switching transistor via a differentiating device and wherein said first control signal varies a threshold level of said second switching transistor in accordance with said input supply voltage magnitude.

6. The apparatus of claim 5 wherein said differentiating device comprises a high-pass filter.

7. The apparatus of claim 6 wherein said high-pass filter comprises a capacitor and a resistor.

8. The apparatus of claim 1 wherein said second switching transistor is responsive to a signal produced in a winding of said transformer to control when, during said period, conduction in said second switching transistor begins.

9. The apparatus of claim 1 wherein a voltage that is developed across said second switching transistor is of an opposite phase from a phase of said alternating current supply voltage.

10. The apparatus of claim 1 wherein said detector is responsive to a peak value of a signal that is developed in a winding of said transformer.

11. The apparatus of claim 10 wherein said detector comprises a diode.

12. A power supply apparatus, comprising:
a transformer;
a source of an input supply voltage;
a first switching transistor for periodically coupling said input supply voltage source and to said transformer to produce a periodic supply voltage in a first winding of said transformer;
a second switching transistor coupled to said first winding to form a synchronous rectifier for rectifying said periodic supply voltage to produce a rectified output that is coupled to a load;
a pulse generator responsive to a signal developed in a winding of said transformer for generating a first switch control signal and a time shifted second switch control signal that are both coupled to said second switching transistor to control periodically when conduction begins and when conduction ends, respectively, in said second switching transistor for providing synchronous rectification; and
a detector responsive to a signal developed in a winding of said transformer and coupled to said second switching transistor for altering in accordance therewith a threshold of said second switching transistor to alter a duration of the conduction of said second switching transistor.

13. The apparatus of claim 12 wherein said detector is configured to detect a magnitude of said input supply voltage and to alter said duration of conduction of said second switching transistor in accordance with a corresponding alteration in said input supply voltage magnitude.

14. The apparatus of claim 13 wherein said detector is coupled to receive the same signal produced in the same winding of the transformer that is used for the generation said first and said time shifted switch control signals in said pulse generator.

15. The apparatus of claim 12 wherein said pulse generator comprises a differentiator.

16. The apparatus of claim 12 wherein said first switch control signal and said time shifted switch control signal form transition edges that vary at opposite directions, respectively, of a combined control signal that is applied to a control terminal of said second switching transistor.

17. A power supply apparatus, comprising:
a transformer;
a source of an input supply voltage;
a first switching transistor for periodically coupling said input supply voltage source and to said transformer to produce a periodic supply voltage in a first winding of said transformer;
a second switching transistor coupled to said first winding to form a synchronous rectifier for rectifying said periodic supply voltage to produce a rectified output that is coupled to a load;
a differentiator responsive to a signal developed in a winding of said transformer for generating a switch control signal that is coupled to a control terminal of said second switching transistor to control switching operation in said second switching transistor for providing synchronous rectification; and
a peak rectifier responsive to a signal developed in a winding of said transformer for generating a second control signal that is coupled to said control terminal of said second switching transistor for altering in accordance therewith a threshold of said second switching transistor to alter a duration of the conduction of said second switching transistor.

\* \* \* \* \*